(12) United States Patent
Wu et al.

(10) Patent No.: US 11,070,888 B1
(45) Date of Patent: Jul. 20, 2021

(54) CONTENT STRUCTURE AWARE MULTIMEDIA STREAMING SERVICE FOR MOVIES, TV SHOWS AND MULTIMEDIA CONTENTS

(71) Applicant: WeMovie Technologies, San Ramon, CA (US)

(72) Inventors: Xidong Wu, San Ramon, CA (US); Xiubo Wu, Beijing (CN)

(73) Assignee: WeMovie Technologies, San Ramon, CA (US)

( * ) Notice: Subject to any disclaimer, the term of this patent is extended or adjusted under 35 U.S.C. 154(b) by 0 days.

(21) Appl. No.: 17/004,383

(22) Filed: Aug. 27, 2020

(51) Int. Cl.
| | |
|---|---|
| *H04N 21/482* | (2011.01) |
| *H04N 21/435* | (2011.01) |
| *H04N 21/439* | (2011.01) |
| *H04N 21/8405* | (2011.01) |
| *H04N 21/433* | (2011.01) |
| *H04N 21/44* | (2011.01) |
| *H04N 21/4402* | (2011.01) |

(52) U.S. Cl.
CPC ......... *H04N 21/482* (2013.01); *H04N 21/433* (2013.01); *H04N 21/435* (2013.01); *H04N 21/4398* (2013.01); *H04N 21/44016* (2013.01); *H04N 21/44029* (2013.01); *H04N 21/8405* (2013.01)

(58) Field of Classification Search
CPC .. H04N 21/482; H04N 21/433; H04N 21/435; H04N 21/44029; H04N 21/44016; H04N 21/4398; H04N 21/8405
See application file for complete search history.

(56) References Cited

U.S. PATENT DOCUMENTS

| | | | | |
|---|---|---|---|---|
| 2006/0282783 | A1* | 12/2006 | McCarthy | G06F 9/00 |
| 2008/0101476 | A1* | 5/2008 | Tian | H04N 7/12 |
| 2013/0166625 | A1* | 6/2013 | Swaminathan | G06F 15/16 |
| 2015/0082349 | A1* | 3/2015 | Ishtiaq | H04N 21/4316 |
| 2018/0213289 | A1* | 7/2018 | Lee | H04N 21/47205 |
| 2019/0045194 | A1* | 2/2019 | Zavesky | H04N 19/142 |

* cited by examiner

*Primary Examiner* — Anthony Bantamoi
(74) *Attorney, Agent, or Firm* — Perkins Coie LLP (57) ABSTRACT

Methods, apparatus and systems related to packaging a multimedia content for distribution are described. In one example aspect, a method includes receiving media files comprising video or audio data captured at a production stage and determining a hierarchical structure of the multimedia content based on production stage information of the multimedia content. The hierarchical structure indicates that the multimedia content comprises multiple scenes, each of which comprises multiple shots produced with corresponding devices and cast. The method also includes identifying characteristics associated with the individual scenes based on the production stage information, generating multiple copies of the multimedia content at different compression levels, and dividing each of the multiple copies of the multimedia content into segments based on the hierarchical structure. The compression levels and a length of a segment are adaptively adjusted based on the characteristics associated with the individual scenes.

29 Claims, 7 Drawing Sheets

CONTENT STRUCTURE AWARE MULTIMEDIA STREAMING SERVICE FOR MOVIES, TV SHOWS AND MULTIMEDIA CONTENTS

TECHNICAL FIELD

This patent document relates to packaging and distribution of motion pictures, videos, movies or other multimedia products including moving images and associated online distribution or streaming services.

BACKGROUND

Multimedia streaming offers a linear viewing experience of the content that provides limited viewing options by viewers. Viewers are offered a single storyline in a particular movie or TV show even when multiple storylines have been explored during the production time. The linear viewing experience becomes a barrier to many contents to be offered interactively to consumers in the era of the increasingly digitization of various processes and progresses in cloud technologies in the movie and TV production and distribution.

SUMMARY

Described herein are techniques, subsystems and systems for packaging and distribution of multimedia contents.

In one example aspect, a computer-implemented method for processing a multimedia content includes receiving media files comprising video or audio data captured at a production stage and determining a hierarchical structure of the multimedia content based on production stage information of the multimedia content. The hierarchical structure indicates that the multimedia content comprises multiple scenes, each of which comprises multiple shots produced with corresponding devices and cast. The method also includes identifying characteristics associated with the individual scenes based on the production stage information, generating multiple copies of the multimedia content at different compression levels, and dividing each of the multiple copies of the multimedia content into segments based on the hierarchical structure. The compression levels and a length of a segment are adaptively adjusted based on the characteristics associated with the individual scenes.

In another example aspect, a system for editing a multimedia content includes one or more processors and one or more memories including processor executable code. The processor executable code upon execution by the one or more processors configures the one or more processors to receive one or more media files comprising video or audio data captured at a production stage of producing the multimedia content and determine a hierarchical structure of the multimedia content based on production stage information of the multimedia content. The hierarchical structure indicates that the multimedia content comprises multiple scenes, each of which comprises multiple shots produced with corresponding devices and cast. The one or more processors are configured to generate, for an individual scene of the multimedia content, one or more edited media files based on video or audio data captured for the scene and store the one or more edited media files separately from the video or audio data captured for the individual scene according to the hierarchical structure of the multimedia content.

In another example aspect, a system for viewing a multimedia content includes one or more processors and one or more memories including processor executable code. The processor executable code upon execution by the one or more processors configures the one or more processors to display, by a media player, a first media file of a copy of the multimedia content to a user over a network and receive, via a user interface of the media player, a first user input that triggers a display of information about a hierarchical structure of the multimedia content. The hierarchical structure indicates that the multimedia content comprises multiple scenes, each of which comprises multiple shots produced with corresponding devices and cast. The one or more processors are configured receive, via the user interface, a second user input that indicates a viewing change from the first media file to a second media file, where the first and second media files are associated with a same shot or a same scene in the multimedia content. The one or more processors are also configured to display, by the media player, the second media file to the user.

In yet another example aspect, a system searching one or more multimedia contents includes one or more processors and one or more memories including processor executable code. The processor executable code upon execution by the one or more processors configures the one or more processors to receive, via a user interface of a media player, a search keyword from a user and select one or more media files from multiple multimedia contents according to the search keyword. Each of the multiple multimedia contents comprises a hierarchical structure having multiple scenes, each of which comprises multiple shots produced with corresponding devices and cast. The one or more media files are selected based on characteristics associated with individual scenes of each of the multiple multimedia contents, which are determined according to production stage information of the multimedia content. The one or more processors are further configured to provide, via the user interface of the media player, a list of the one or more media files to the user.

The disclosed techniques can be used by directors, editors, or content providers to produce multiple versions of the content based on the same raw video and/or audio data captured in the production stage. Correspondingly, viewers can be presented with the structure of the multimedia content so as to have the flexibility of selecting appropriate versions of the content that suit their interests. The disclosed techniques enable a more interactive viewing experience that cannot be offered by conventional multimedia content. The disclosed techniques can also be implemented to achieve fast searching of video segments (e.g., particular shots and/or scenes within the entire movie or TV show), thereby enabling a refined control of the multimedia content for purposes such as parental control.

DETAILED DESCRIPTION

Figure 1:
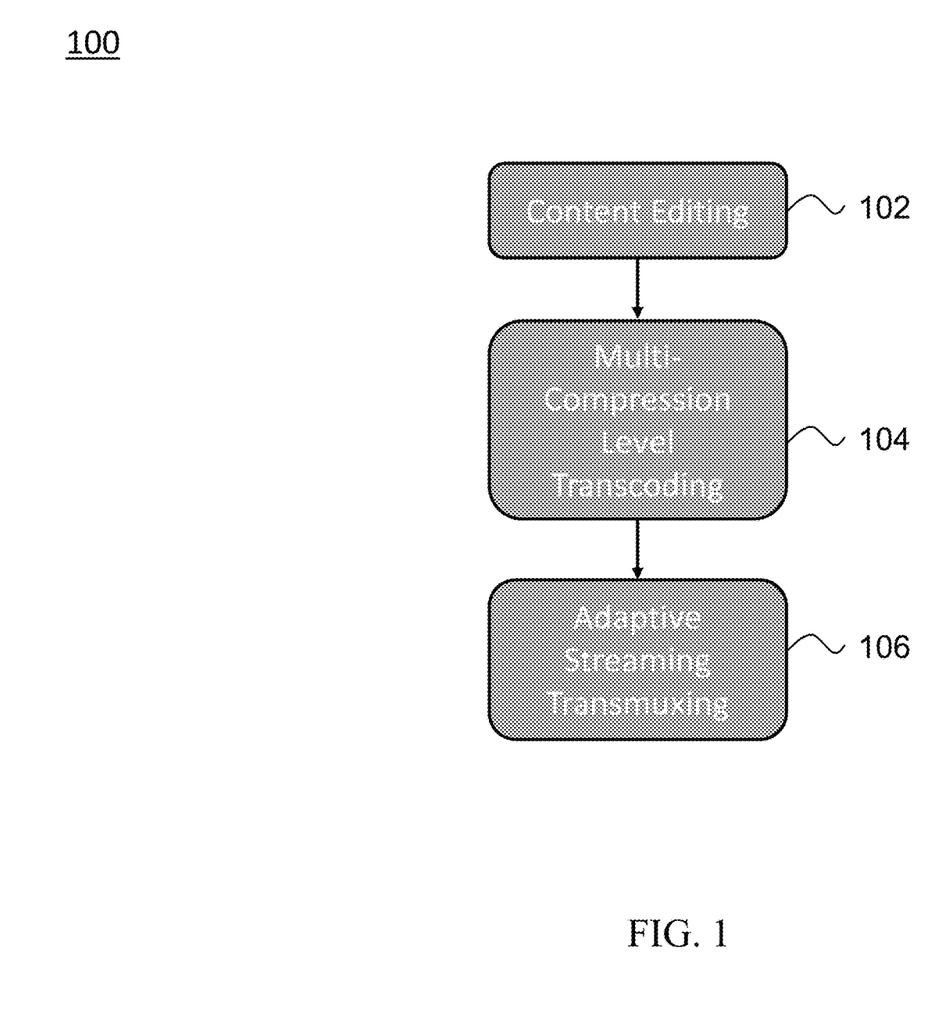
FIG. 1 illustrates example operations that can be performed for packaging and distribution of movies, TV shows, or other multimedia contents after the production of such contents completes.

The post-production for digital footages of movies, TV programs and other multimedia contents can be a complex process involving many components and operations. As advancement in network technologies facilitates streaming of audio and video contents to users in their homes and other places, distribution of the multimedia content also requires complex processing operations to ensure satisfactory viewing experiences for the viewers. FIG. 1 illustrates example operations of three example stages 102, 104 and 106 that can be performed to digitally process and package the content for distribution of movies, TV shows, or other multimedia contents after the post-production of such contents completes. In some implementations, for example, these operations can be performed to the multimedia contents after they are delivered to the content providers such as video streaming service companies from the producers.

The Operation 102 is content editing via digital editing operations, either automatically by machine or with manual operations of software by human operators. The storyline of a movie, a TV show, or other multimedia content often includes multiple scenes, each having multiple shots. Multiple cameras and cast members are involved for producing one shot of the scene. In some embodiments, production of the multimedia content can be performed according to a set of machine-readable scripts generated based on the storyline as disclosed in International Patent Application No. PCT/CN2019/090722, entitled "Product-As-a-Service Systems for Making Movies, TV Shows and Multimedia Contents," filed on Jun. 11, 2020, and U.S. Pat. No. 10,721,377 issued on Jul. 21, 2020, which are incorporated by reference in their entirety. After production is completed, the produced raw video/audio data for each scene and difference scenes can be transferred to one or more subsequent processing modules or subsystems to perform subsequent editing operations. In some embodiments, the raw footages can be edited automatically by editing software without manual controlled editing by human operators by digitally processing of the machine-readable scripts as disclosed in International Patent Application No. PCT/US2020/032217, entitled "Fully Automated Post-Production Editing for Movies, TV Shows, and Multimedia Contents," filed on May 8, 2020, which is incorporated by reference in its entirety. Alternatively, or in addition, manual editing with one or more human operators can be performed to incorporate artistic features desired by the editors or directors.

Figure 2:
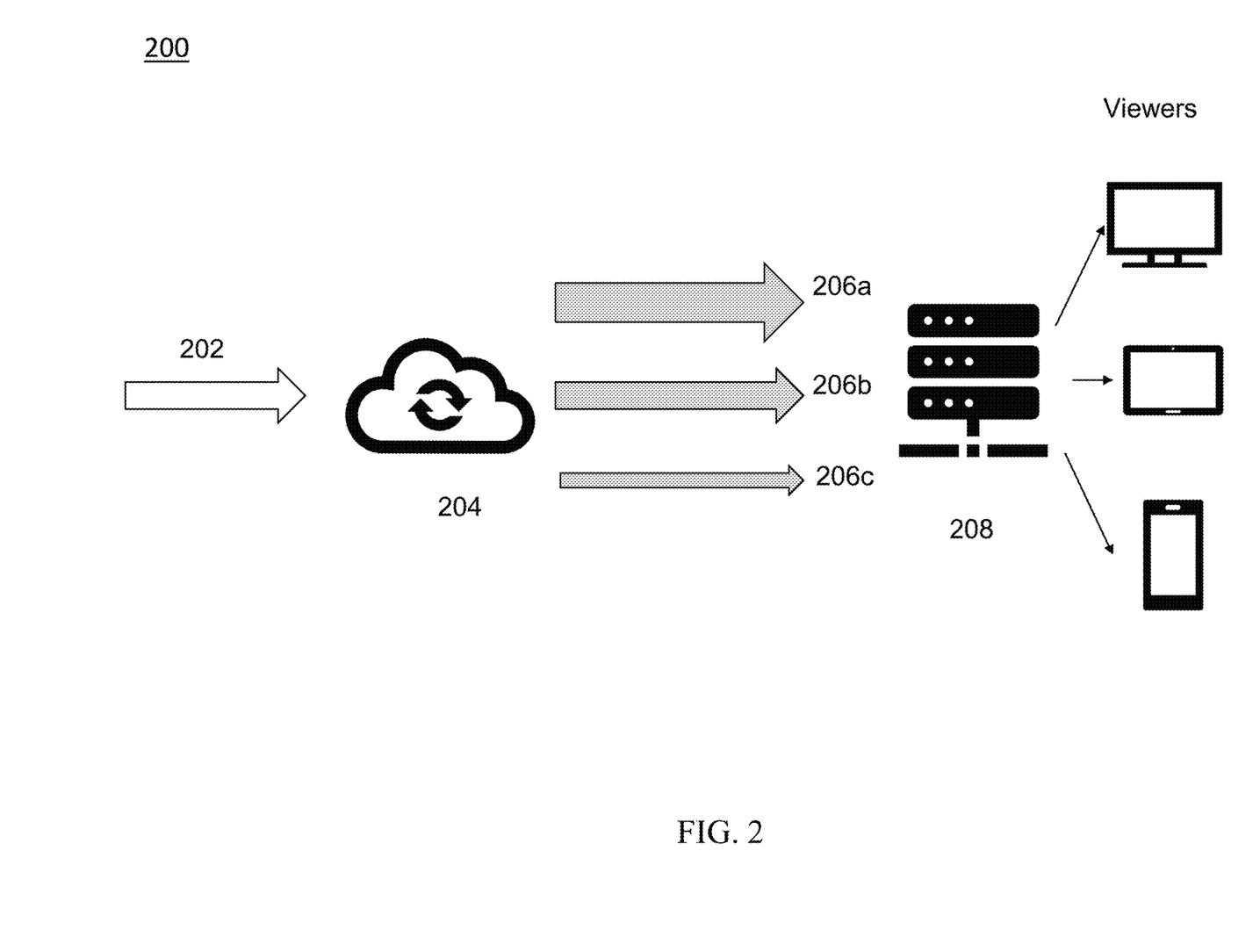
FIG. 2 illustrates an example adaptive streaming process to generate contents with different compression levels and/or bitrates for different viewers.

The next Operation 104 in the process in FIG. 1 is Multi-Compression Level Transcoding. The edited version of the multimedia content can be encoded into different formats, such as Flash (.f4v), Moving Picture Experts Group (MPEG) 4 (mp4), or QuickTime (.mov). The encoded video may have a large size (e.g., multiple Gigabytes) and thus the speed of transmission of such large encoded video data online may be limited by the bandwidth available for the transmission and such limitations may cause undesired delays that adversely affect the viewing experience. To allow viewers to view the content seamlessly on various streaming platforms, the Operation 104 includes a video compression process to reduce the amount of video data to be transmitted to ensure timely transmission of encoded video data for satisfactory user viewing experience. One example of such a compression process is adaptive streaming compresses multimedia content at different compression levels according to the network conditions and stream such compressed multimedia content data via communication networks to reduce delays in receiving the video data at the user devices. FIG. 2 illustrates an example adaptive streaming process 200 as part of the Operation 104 in FIG. 1 to generate contents with different compression levels and/or bitrates for different viewers. The input stream 202 of the adaptive streaming process 200 is the edited version of the multimedia content that typically has a relatively high bitrate. The input stream 202 goes through an encoder 204 that is configured to process the input stream 202 using different compression levels and generate multiple output streams having different bitrates. For example, the output stream 206a has a high bitrate corresponding to a low compression level, the output stream 206b has a medium bitrate corresponding to a medium compression level, and the output stream 206c has a low bitrate corresponding to a high compression level. Based on the network conditions and/or device capabilities for the viewers, the control server 208 can provide the appropriate output stream to different viewers.

Referring back to FIG. 1, the Operation 106 is Adaptive Streaming Transmuxing by processing the output from the Operation 104. The transmuxing process is to package the compression encoded media stream into a container for online streaming. Metadata, which may be in the XML format in implementations, is created in the Operation 106 to provide information on the encoded data such as the encoding information, the bit rate, a playlist of chunks or segments of the content and other information that the client side player needs before the media stream starts to be transmitted by the server and received by the client. To provide smooth viewing experience, the adaptive transmuxing process enables viewers to start viewing part of the content before the entire content becomes available at the client side. In achieving so, the transmuxing operation is designed to divide the content into smaller segments such that some segments become viewable to the viewers while remaining segments are being transferred over the network. Adaptive streaming transmuxing divides each encoded file (e.g., with an individual bitrate) into multiple equal transport units (also referred to as chunks). The length of a chunk can be configured based on the bitrate and/or compression level to adapt to network condition changes. In some embodiments, all chunks in the multimedia content are packaged in an adaptive streaming container in a particular format, such as Hypertext Transfer Protocol (HTTP) Live Streaming (HLS), Dynamic Adaptive Streaming over HTTP (DASH), etc. Based on network conditions, the client-side player requests contents having different bitrates and/or compression levels based on the network conditions, and the corresponding chunks can be transferred over the network.

In some existing implementations, encoding and distribution of the multimedia contents are disassociated from the production and post-production stages. Under such a design, the transcoding and transmuxing processes of the distribution system are not correlated with how the content was produced (e.g., whether the whole content is simply a continuous/non-stop video capture or it is a complex structured media product such as a movie of TV episode with many scenes as defined in the storyline, how many shots in each scene, etc.). Correspondingly, such transcoding and transmuxing operations when used in the process illustrated in FIG. 1 are performed to account for changes in network conditions and/or device capacity only. However, changes in scenes and/or shots of the multimedia contents can bring significant impact on the transcoding and transmuxing operations of the content. For example, the compression efficiency is heavily dependent on motion detection in or between the scenes. Compression efficiency can be much higher if the encoder is aware of scene changes and/or shot changes. If the compression system has information on what kind of scene it is (e.g., as defined in the movie script), this information can be processed to determine what kind of compression it should use to achieve the highest efficiency. Furthermore, the chunk size determination in various implementations of the process in FIG. 1 is completely agnostic about the scene/shot structure of the multimedia content. When the network condition changes, a bit rate change can happen in the middle of a shot, resulting in suboptimal viewing experience. In some cases, content providers may need to insert commercials between chunks in the multimedia contents. A commercial may be inserted in the middle of the shot, causing interruptions that can negatively affect viewers' viewing experiences.

This patent document discloses techniques that can be implemented in various embodiments to provide effective packaging and distribution of the multimedia contents based on production stage information. Production stage information, such as the structure of the scenes/shots in the storyline or equipment/staff involved for each scene or shot, can be determined during or after the production stage and be included as metadata in the adaptive streaming container, thereby allowing adaptive transcoding and transmuxing to adapt to scene/shot changes in the multimedia contents. Such encoded streaming video data with such production stage information can be streamed to viewer devices to enhance the viewing experience by allowing viewers to select the ways in which the multimedia contents are to be viewed based on selection of certain parameters provided based on the production stage information including, for example, different storylines within a movie (e.g., different endings) or different shots of a scene in a movie.

Figure 3:
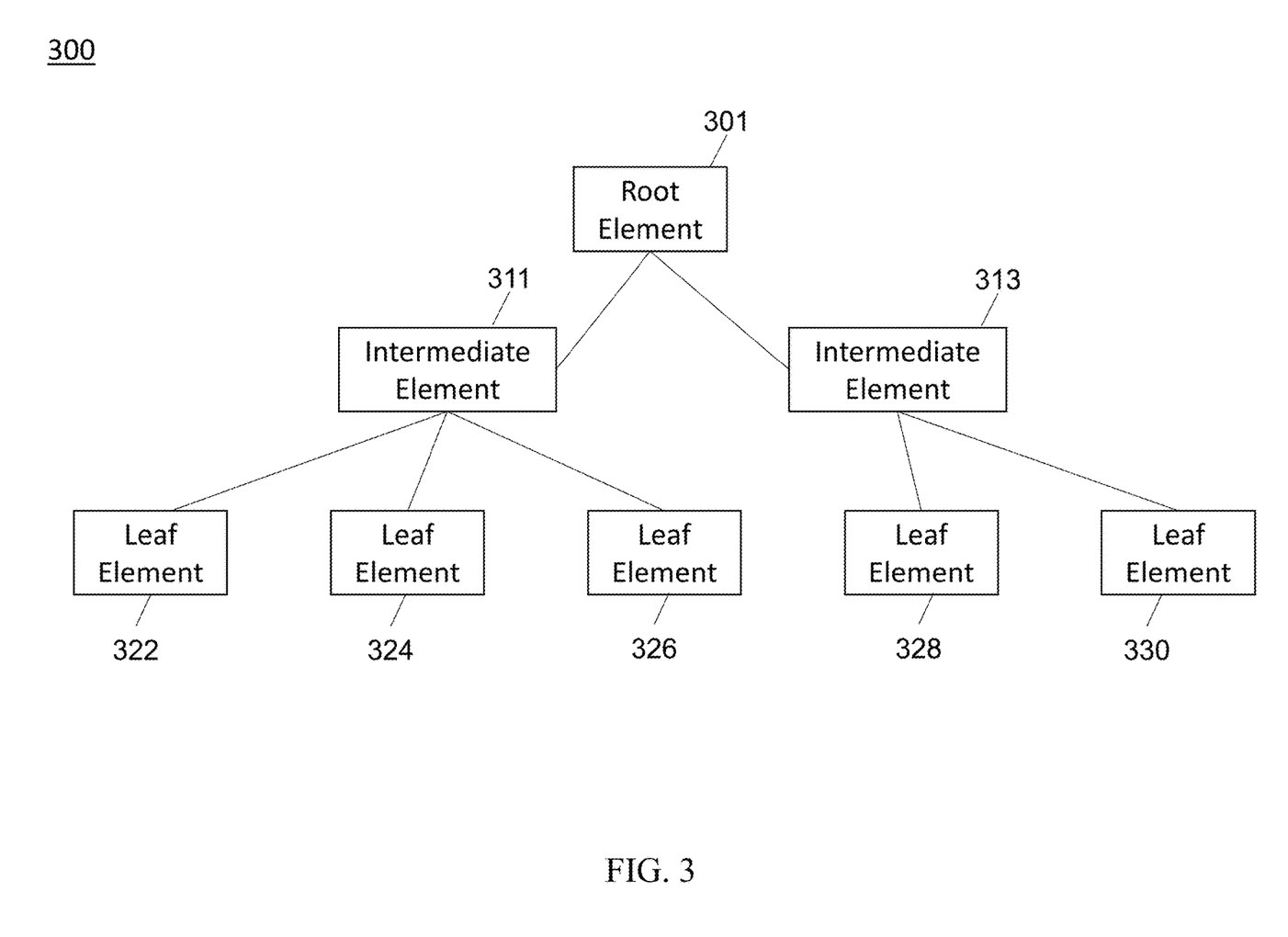
FIG. 3 illustrates an example structured data format in accordance with the present technology.

Metadata about the production stage information can be generated during or after the production stage (e.g., in Operation 102 shown in FIG. 1). The metadata can be represented in a structured data format such as the Extensible Markup Language (XML) format. FIG. 3 illustrates an example structured data format 300 in accordance with the present technology. The structured data format 300 describes the hierarchical structure of the multimedia content. The root element 301, for example, can include production stage information such as the title, the genre of the content, the producer, and overall cast information. Intermediate elements 311, 313 can include scene/shot-level information for corresponding scenes/shots. For example, information can be included in the intermediate elements 311, 313 to indicate the level of movement or the amount of actions in the corresponding scenes/shots. Each scene/shot-level element corresponds to multiple leaf elements 322, 324, 326, 328, 330 (each corresponds to one camera capture) that includes each camera information. For example, each of the leaf elements 322, 324, 326, 328, 330 can include an identifier for the corresponding camera capture, information about the equipment for the shot (e.g., camera angle, zoom, etc.), information about the cast involved for the shot, and other characteristics of the video capture (e.g., whether the capture is mostly static or full of actions). The leaf element can also include a link or a location indicator indicating the location of the video capture in the multimedia content so that the video clip can be readily located in the content.

In some embodiments, machine-readable scripts are used in the production stage and/or post-production editing, as disclosed in International Patent Application No. PCT/CN2019/09072, U.S. Pat. No. 10,721,377 and International Patent Application No. PCT/US2020/032217. Information included the machine-readable scripts can be exported to the structured data format as metadata to be used for transcoding and transmuxing. For example, the machine-readable scripts can provide information such as the type of scene/shot, actor/actress info, location, time, objects used in each of the shots in a scene.

In some embodiments, the metadata to be used for transcoding and transmuxing can be generated based on operations performed in the content editing operation. For example, as the director goes through the raw video data of captured scenes and shots, information about the individual scenes/shots and the corresponding hierarchical structure can be labeled. The labeled metadata is then organized into the structured data format such as an XML file. The metadata can be implemented using industry standard MPEG-7 format with certain extensions. The metadata can also be implemented using proprietary format(s). Table 1 shows an example of the proprietary structured data format in accordance with the present technology.

TABLE 1

Example Metadata in Structured Data Format

```
<movie>
    <title> Forest Gump </title>
<genre> Romance </genre>
    <scene id=5>
    <transition>fade in</transition>
    <movietime>00:30:25</movietime>
    <duration unit=minute>15</duration>
    <location>
        <city>San Francisco</city>
        <latitude>120000</latitude>
        <longitude>120000</ longitude>
        <indoor_outdoor>outdoor<indoor_outdoor>
        <address>...</address>
    </location>
    <staff>
        <director>John Doe</director>
        <photographers>
        ...
        </photographers>
        ...
    </staff>
    <casts>
        <actor>Forrest</actor>
        <actress>Jenny</actress>
        ...
    </casts>
    <commercials>
        <commercial id=1>
            <type>billboard</type>
            <shape>rectangle</shape>
            <pattern>black-white-grid</pattern>
            <commercial id=1>
            ...
    </commercials>
    <cameras>
        ...
    </cameras>
    <vehicles>
        ...
    </vehicles>
```

TABLE 1-continued

Example Metadata in Structured Data Format

```
<shot id=1>
    <camera id=1>
        <shot_type>close-up shot</shot_type>
        <direction>Forrest/right</direction>
        <angle>horizontal</angle>
        <URL>http://example.com/movies/forrestgump/sce5-shot1-camera1.mp4</URL>
    </camera>
    <camera id=2>
        <shot_type>close-up shot</shot_type>
        <direction>Jenny/left</direction>
        <angle>horizontal</angle>
        <URL>http://example.com/movies/forrestgump/sce5-shot1-camera2.mp4</URL>
    </camera>
    <camera id=3>
        <shot_type>media shot</shot_type>
        <direction>Forrest/Jenny/front</direction>
        <angle>horizontal</angle>
        <URL>http://example.com/movies/forrestgump/sce5-shot1-camera3.mp4</URL>
    </camera>
    <cut type='jump'>camera 3</cut>
    <action id=1 lapse=5s>Forrest and Jenny walking forward</action>
    <cut type='jump'>camera 2</cut>
    <line speaker='Forrest'>Which college are you going</line>
    <music>
        <id>12</id>
        <type>romantic</type>
        <action>play</action>
    </music>
    <cut type='match'>camera 3</cut>
    <action id=2>Jenny turned to Forrest</action>
    <line speaker='Jenny'>I am going to DC to protest</line>
    <action id=3 lapse=40s>Forrest and Jenny walk in silence</action>
    <cut type='jump'>camera 1</cut>
    <music>
        <action>stop</action>
    </music>
</shot>
...
<shot id=2>
</shot>
...
<shot id=3>
</shot>
<transition>dissolve</transition>
</scene>
...
</movie>
```

In some embodiments, the raw multimedia video and/or audio data can be organized according to the hierarchical structure indicated by the structured data format. For example, as shown in Table 1, multiple cameras are used for a particular shot in a scene. Raw video/audio clips captured by different devices for the shot (e.g., from different angles) can be saved into separate file containers. The final edited video for the shot/scene can be saved into an additional file container. The separate file containers of different shots and/or scenes are organized into the hierarchical structure corresponding to the metadata. The availability of raw video/audio data from different cameras enables custom editing of the multimedia content. Additional and/or alternative storylines can be created based on adding or changing the metadata of the multimedia content.

Given the hierarchical structure of the multimedia content and the production stage information in the metadata, transcoding operation can be performed adaptively at a shot-level or a scene level according to the characteristic of the shot and/or scene. For example, for static shots or scenes without much motion, the compression level can be increased to create copies of the video data having different bitrates. On the other hand, if the scene or the shot includes lots of motions or actions, the compression level can be adjusted to account for the complexity in video compression. That is, instead of having uniform levels of bitrates for the entire multimedia content, file containers for different scenes/shots can have different bitrate levels corresponding to the contents of the scenes/shots.

Figure 4:
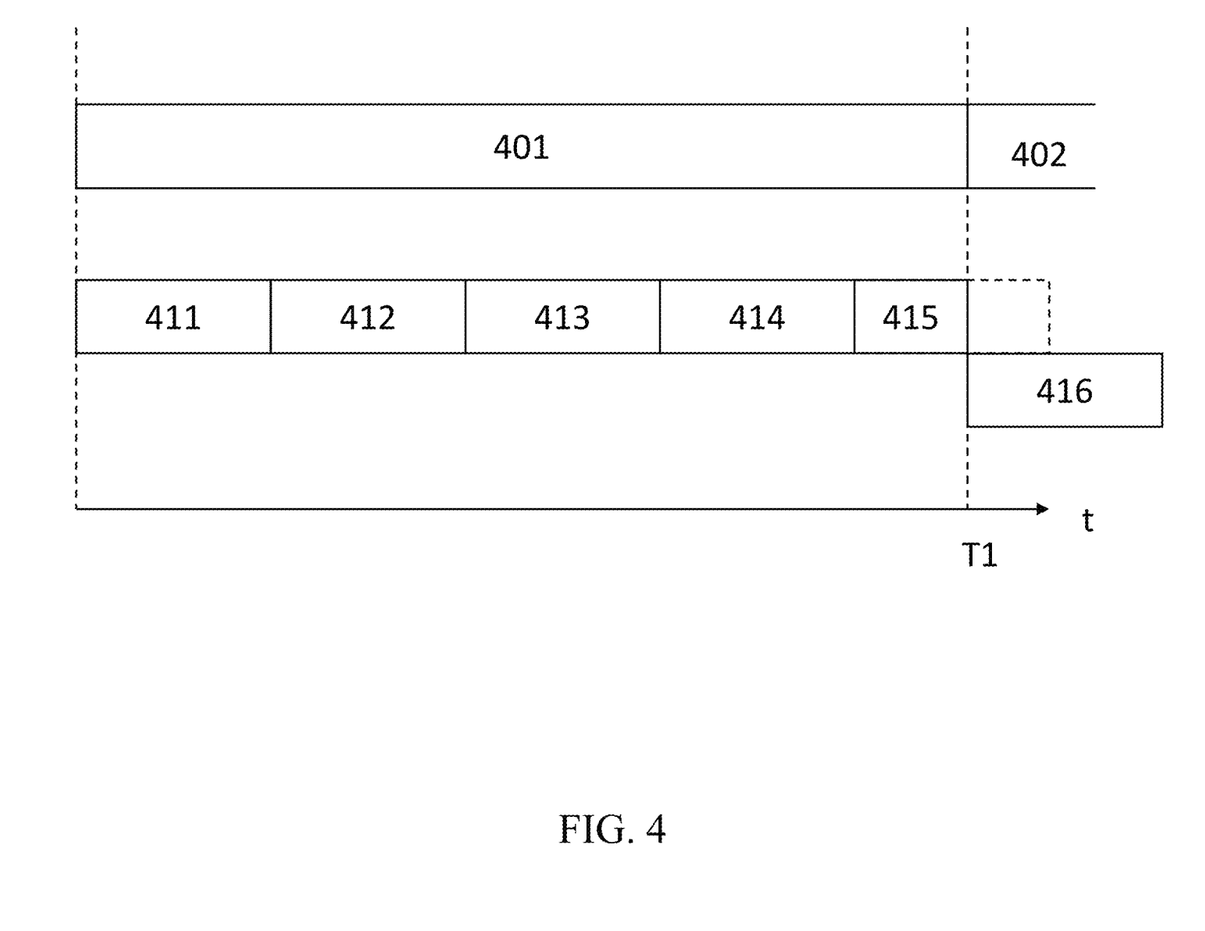
FIG. 4 illustrates an example of segmented shot in accordance with the present technology.

In some embodiments, transmuxing operation can be performed at a shot-level so that chunks are generated according to the boundaries of the shots. FIG. 4 illustrates an example of segmented shot in accordance with the present technology. The shot 401 has a length of T1 in the time domain. The shot 401 is segmented into five chunks 411-415 in time. The chunk 415 has a shorter length so that it does not expand across two shots. The next shot 402 is then segmented into additional chunks, including chunk 416. In some embodiments, the chunk size can be adjusted according to the characteristic of the shot. For example, for static shots, larger chunk sizes can be used for efficient video compressions. For shots that include lots of actions, smaller chunk sizes can be used to account for compression complexity.

Figure 5:
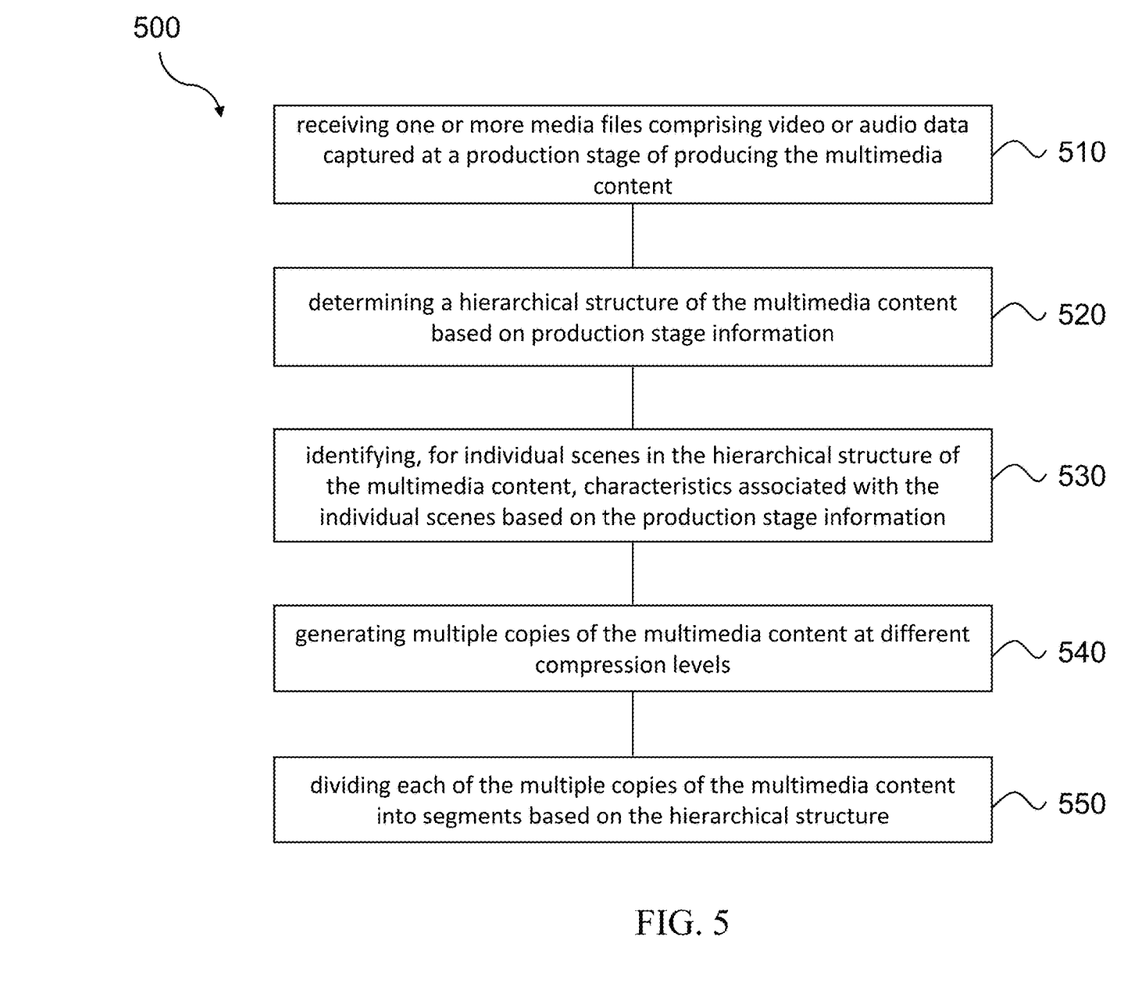
FIG. 5 is a flowchart representation of a method for processing a multimedia content in accordance with the present technology.

FIG. 5 is a flowchart representation of an example of a method 500 for processing a multimedia content in accordance with the present technology. The method 500 includes, at operation 510, receiving one or more media files and metadata information of a multimedia content. Each of the one or more media files comprises video or audio data (e.g., video/audio clips) captured at a production stage for producing the multimedia content. The metadata information indicates production stage information of the multimedia content. The metadata information can be determined during the production stage for producing the multimedia content (e.g., represented as the machine-readable scripts as disclosed in International Patent Application No. PCT/CN2019/09072, U.S. Pat. No. 10,721,377 and International Patent Application No. PCT/US2020/032217). That is, the production stage information (e.g., The metadata information can also be generated after the production stage (e.g., based on operations performed in the content editing operation). The production stage information comprises at least a genre of the multimedia content, information about the devices and cast for a shot, or content of video or audio data corresponding to a shot.

The method 500 includes, at operation 520, determining a hierarchical structure of the multimedia content based on the production stage information. The hierarchical structure indicates that the multimedia content includes multiple scenes and each of the multiple scenes includes multiple shots produced with corresponding devices and cast. In some embodiments, the hierarchical structure can be the same as the machine-readable scripts or a simplified version of the machine-readable scripts. In some embodiments, the one or more media files are organized according to the hierarchical structure, and there is information identifying a location of a media file in the multimedia content. For example, video clips captured from different angles by different devices can be organized as leaf elements of a corresponding shot in the hierarchical structure.

The method 500 includes, at operation 530, identifying, for individual scenes in the hierarchical structure of the multimedia content, characteristics associated with the individual scenes based on the production stage information. As discussed above, the production stage information can include a genre of the multimedia content, information about the devices and cast for a shot, or content of video or audio data corresponding to a shot. In some embodiments, the characteristics associated with the individual scenes indicate an amount of motions in the individual scenes. For example, the information provided in the hierarchical structure (e.g., the XML file) can indicate whether a scene or a shot comprises lots of actions or mostly static. As shown in Table 1, the shot type (e.g., close-up shot) and the action identifier (e.g., Forrest and Jenny walking forward) can be used to determine that the corresponding shot is mostly a static shot with conversations. As another example, an action identifier identifying a fight between the characters can be used to determine that the corresponding shot includes lots of motions and changes. The characteristics associated with the individual scenes can be used for subsequent transcoding and transmuxing.

The method 500 includes, at operation 540, generating multiple copies of the multimedia content at different compression levels. The different compression levels are adaptively adjusted for the individual scenes based on the characteristics associated with the individual scenes. For example, to achieve the same bitrate, a higher compression level can be applied for scene(s)/shot(s) that are mostly static as compared to scene(s)/shot(s) that have lots of motions and changes. The method 600 also includes, at operation 650, dividing each of the multiple copies of the multimedia content into segments based on the hierarchical structure, where a length of a segment is adaptively adjusted based on the characteristics associated with the individual scenes. That is, instead of using a uniform chunk size, the chunk size can vary adaptively according to boundaries of shot(s)/scene(s) to ensure a seamless viewing experience for the viewers.

The disclosed techniques can be implemented in ways to provide various unique services with useful features such as post-production customized editing, customized viewing, fast video searching, etc. For example, the disclosed techniques can be implemented to enable producers, directors, or the content providers/distributers to make different custom versions of a movie/TV program suitable for different viewer groups. In some implementations, the disclosed techniques can be used to allow producers, directors, or the content providers/distributers to generate and to store, for one or more individual scenes in the multimedia content, differently edited media files based on video or audio data captured during shooting of the scene. Multiple differently edited media files are produced for each shot in the scene. Based on the hierarchical structure of the multimedia content, the one or more edited media files can be stored separately from the video or audio data captured for the individual scene. In some embodiments, the disclosed techniques can be used to generate, based on the same video or audio data captured at the production stage, multiple versions of the multimedia content corresponding to different storylines for the same movie or TV program. The option for selecting one of the different versions of the multimedia content is provided via a user interface with a navigation list or menu that contains the different versions and represents the hierarchical structure of the multimedia content of each version.

During the custom editing process, the disclosed techniques enable commercials and other digital material to be inserted into the content based on the boundaries of the shots/scenes and/or the content of the shots/scenes so as to minimize the level or extent of viewing interruption caused by an inserted commercial or advertisement and to provide a seamless viewing experience to the viewers. For example, some implementations of the commercial insertion allows inserting a commercial media file between two adjacent segments of the multimedia content based on a content of the commercial media file and contents of the two adjacent segments. The navigation list comprises information about a transition type between the commercial media file and the two adjacent segments.

In addition to providing editing and modifying options for producers, directors, or the content providers/distributers, the disclosed techniques can also be implemented to provide viewer options in connection with the different versions of a movie or TV program generated by producers, directors, or the content providers/distributers. For example, the disclosed techniques can be implemented to provide a user interface in a media player for viewers to select and view different existing versions of the content and/or to create custom content on the fly at viewing time. Some implementations can include a user interface for displaying, in one or more navigation lists shown via a user interface of a media player, multiple versions of the multimedia content corresponding to different storylines generated based on the same video or audio data captured at the production stage. Specifically, when the different storylines include at least a first storyline and a second different storyline, the disclosed techniques can be used to provide a viewer user interface in a viewer media player forreceiving a user input indicating a switch between the first storyline and the second storyline (e.g., switching from the first storyline to the second when the viewer previously selects the first storyline) and displaying a version of the multimedia content corresponding to the second storyline to the user. In some embodiments, the viewer user interface can be structured for displaying a first media file of the multimedia content to a user via a network, displaying, in a navigation list shown via a user interface of a media player, information about the hierarchical structure of the multimedia content to a user, and receiving a user input via the user interface of the media player. The user input indicates a viewing change from the first media file to a second media file, where the first and second media files are associated with a same device, a same shot, or a same scene in the multimedia content. The method also includes switching to display the second media file to the user. In some embodiments, the first media file and the second media file are captured at different angles by the same device or different devices. In some embodiments, the second media file comprises video or audio data captured for a shot or a scene, and the first media file comprises an edited version of the captured video or audio data. In some embodiments, the method includes simultaneously displaying, in a view area that comprises multiple sub-regions, multiple media files captured at different angles for one or more shots. One of the media files is displayed in a first sub-region that has a larger dimension than other sub-regions. In some embodiments, each segment of a copy of the multimedia content is within boundaries of a shot.

As yet another example, the disclosed techniques can be used to perform fast video search on a shot/scene level. In some embodiments, the fast search can include a viewer search process that receives a search keyword via a user interface of a media player from a user, determines, based on the characteristics associated with the individual scenes, a subset of media files corresponding to the search keyword, and provides, via the user interface of the media player, a list of the subset of media files. In some embodiments, a restriction may be imposed on the list of the subset of media files based on a user input (e.g., for parental control, view group control, or other control purposes).

Some examples of the disclosed techniques are further described in the following example embodiments.

Embodiment 1: Custom Editing Service

Typically, the director(s)/editor(s) may produce a single version of the final edited content. That is, regardless of how many shots and/or scenes were captured during the production stage, a limited number of edited storylines is generated in the end (often times, only one or two storylines are available). The techniques disclosed herein allow not only the director(s)/producer(s) to produce multiple versions of contents but also enable the content provider(s)/distributor(s) to perform desired editing on the contents. The custom editing service, provided either to the director(s)/producer(s) or to the content provider(s)/distributor(s), takes advantage of the availability of raw video/audio data corresponding to the hierarchical structure of the storyline such that multiple custom versions of the edited content can be created for different viewers or viewer groups. A new navigation list is created for each new version of the edited content. When the viewer chooses to view a particular version of the content, the corresponding navigation list can be transmitted to the viewer to enable the viewing experience.

As discussed above, raw video/audio clips captured by different devices for the shot can be saved into separate file containers along with the metadata. For example, at the shot level, multiple versions of the edited shot can be created and stored as additional file containers. Similarly, at the scene level, multiple versions of the edited scene can be saved separately from the raw video/audio content. Metadata stored in the structured data format (e.g., the XML file) can be updated to indicate different or alternative hierarchical structures of the edited file containers so that different final versions of the multimedia content can be provided to the viewers.

In one example aspect, the custom editing service can be provided by a system for editing a multimedia content that includes one or more processors and one or more memories including processor executable code. The processor executable code upon execution by the one or more processors configures the one or more processors to receive one or more media files comprising video or audio data captured at a production stage of producing the multimedia content and determine a hierarchical structure of the multimedia content based on production stage information of the multimedia content. The hierarchical structure indicates that the multimedia content comprises multiple scenes, each of which comprises multiple shots produced with corresponding devices and cast. The one or more processors are configured to generate, for an individual scene of the multimedia content, one or more edited media files based on video or audio data captured for the scene and store the one or more edited media files separately from the video or audio data captured for the individual scene according to the hierarchical structure of the multimedia content.

In some embodiments, the one or more processors are configured to generate, based on the same video or audio data captured at the production stage, multiple versions of the multimedia content corresponding to different storylines. In some embodiments, the one or more processors can be further configured to insert a commercial media file between two segments of the multimedia content.

The custom editing service can be used by editor(s) or director(s) to minimize the amount of work needed to create different versions of the content (e.g., to create different storylines, to meet different rating requirements, etc.). The custom editing service can also be used as a real-time service by content providers to insert different commercials at the boundaries of the shots/scenes. Streaming service providers can perform real-time custom editing based on the content of the scene/shot as well as the bidding prices of commercials to optimize the placement of the commercials within the multimedia contents.

In some embodiments, knowing the scene/shot boundaries allows the custom editing service to define video transition effects (e.g., fade, dissolve, wipe, etc.). In particular, in the case of inserting a commercial between scenes, it is desirable to use a video transition type that suits both the multimedia content and commercial content involved in the transition to enable a smooth viewing experience. The transition type can also be defined in the navigation list.

Embodiment 2: Custom Viewing Service

In some embodiments, the techniques disclosed here can be implemented to provide a custom viewing service. Conventionally, viewers are provided a single version of the edited content. However, because multiple versions of the edited content can be composed much more easily using the disclosed techniques, viewers can have the freedom to select the desired storyline(s) based on their interests and/or tastes. For example, given the availability of multiple versions of edited content (e.g., as discussed in Embodiment 1), viewers can pick and choose which storyline they would like to watch. A viewer can start viewing a multimedia content according to the default storyline and pause the content to make a selection during the viewing time.

Figure 6:
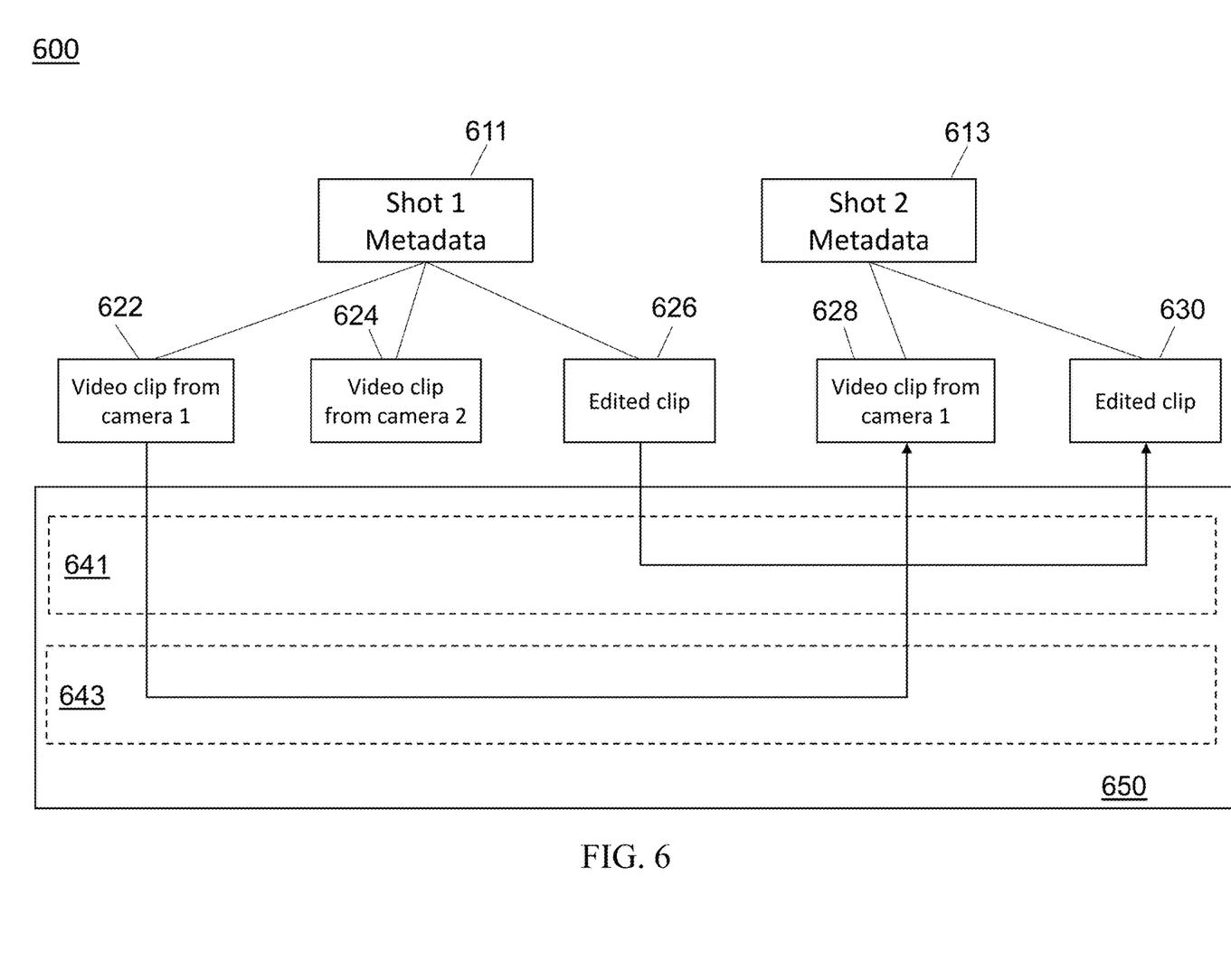
FIG. 6 illustrates an example scenario of using a navigation list to view different sequences of shots in accordance with one or more embodiments of the present technology.

In some embodiments, a media player can be implemented to show a navigation list, via a user interface, to illustrate different sequences of scenes/shots that correspond to different storylines. The navigation list can be a simplified version of the hierarchical structure of the content generated based on the structured data format as shown in Table 1. FIG. 6 illustrates an example scenario 600 of using a navigation list to view different sequences of shots in accordance with one or more embodiments of the present technology. In this example, the navigation list 650 includes different sequences 641, 643 of playing the content. The default sequence 641 indicates that the edited clips 626, 630 of the two shots are to be played at viewing time. Alternatively, the viewer can select the custom sequence 643, which plays the raw video clip from camera 1 (622) for shot 1 first, followed by the raw video clip from camera 1 (628) for shot 2. In some embodiments, the video clips in a custom sequence are associated with each other at a device level (e.g., as in custom sequence 643), at a shot level (e.g., a sequence can include video clips 622, 624 that are captured for the same shot by the same or different devices), or at a scene level (e.g., a sequence can include video clips in the same scene, captured by the same/different devices for the same/different shots). The custom sequences can be created by the editor, the director, or the content provider using the custom editing service as discussed in Embodiment 1. Alternatively, the viewer can create the custom sequence 643 based on the hierarchical structure of the multimedia content. For example, the media player can display auxiliary information to help user identify which storyline or sequence is suitable for the viewer's taste. The user interface allows the viewer to select which sequence/scene/shot/camera of the storyline to continue the viewing experience. Additional video transition effects (e.g., fade, dissolve, wipe, etc.) can be added automatically or based on viewer's selection should the view decides to switch the playing sequence.

In some embodiments, given the availability of the raw video clips from different cameras and/or angles, the viewer interface of a media player can be designed to allow viewers can simultaneously watch multiple video captures from different cameras and/or camera angles for same shot. When a viewer chooses to view clips from multiple cameras, the streaming server can send multiple video clips (e.g., with different resolutions and/or compression levels) to the media player. The media player can split the viewing screen into multiple rectangle sub-screens, each displaying a video clip from a corresponding camera. For example, the viewing screen can be divided into a main sub-region with a larger dimension and several small sub-regions. The main sub-region displays the producer's edited version, and smaller sub-regions display video clips from cameras with different shooting angles.

In some embodiments, given the navigation list, viewers can fast-forward or rewind the media content more precisely according to the scenes and/or shots. For example, instead of fast-forwarding or rewinding the multimedia content based on equally-sized time units (e.g., 1 second as 1× speed, 5 seconds as 2× speed, etc.), the media player can fast-forward or rewind the content to the time-domain boundary (e.g., the beginning or the end) of a different shot or a different scene. Accordingly, when viewers try to move to a target scene or shot, there is no need for them to go through unrelated scenes or shots. Also, the viewers would not miss the target scene or shot due to the time unit size being too large (e.g., the fast-forwarding or rewinding speed is too fast).

In one example aspect, the custom viewing service can be provided by a system for viewing a multimedia content that includes one or more processors and one or more memories including processor executable code. The processor executable code upon execution by the one or more processors configures the one or more processors to display, by a media player, a first media file of a copy of the multimedia content to a user over a network and receive, via a user interface of the media player, a first user input that triggers a display of information about a hierarchical structure of the multimedia content. The hierarchical structure indicates that the multimedia content comprises multiple scenes, each of which comprises multiple shots produced with corresponding devices and cast. The one or more processors are configured to receive, via the user interface, a second user input that indicates a viewing change from the first media file to a second media file. The first and second media files are associated with a same shot or a same scene in the multimedia content. The one or more processors are further configured to display, by the media player, the second media file to the user.

In some embodiments, the first media file and the second media file are generated based on same video or audio data captured at the production stage corresponding to different storylines. In some embodiments, the first media file and the second media file are captured by different cameras at different angles for the same shot. In some embodiments, the second media file comprises video or audio data captured for a shot or a scene, and the first media file comprises an edited version of the captured video or audio data (that is, the user chooses to view the raw captured video/audio data).

Using the disclosed techniques, the viewing experience now becomes much more interactive, and viewers are given the freedom to explore different possible endings of the content.

Embodiment 3: Video Searching Service

Because raw audio/video data as well as the edited content are organized according to the metadata which has information for each scene/shot/camera capture, video searching efficiency can be vastly improved with the assistance of the metadata information. Furthermore, instead of locating the entire multimedia content based on the search keywords, the disclosed techniques enable the viewers to locate smaller snippets of the content (e.g., a few shots, or a scene, and even a shot from a specific camera angle) in a vast database of multimedia contents.

In some embodiments, the hierarchical structured metadata can be converted to a flat structure format and stored in database for search and analytical purposes. Certain key words of the scenes/shots can be indexed to allow viewers to quickly search through the available multimedia contents and locate desired shots. For example, a viewer can query all the kissing shots by entering the keyword "kiss" via the user interface of the media player. The viewer can add additional filtering options to limit the amount of returned results. In some embodiments, the viewer can impose a restriction on the search results so that the relevant video snippets are restricted or not viewable (e.g., for parental control purposes).

In one example aspect, the video searching service can be provided by a system for searching one or more multimedia contents that includes one or more processors and one or more memories including processor executable code. The processor executable code upon execution by the one or more processors configures the one or more processors to receive, via a user interface of a media player, a search keyword from a user and select one or more media files from multiple multimedia contents according to the search keyword. Each of the multiple multimedia contents comprises a hierarchical structure having multiple scenes, each of which comprises multiple shots produced with corresponding devices and cast. The one or more media files are selected based on characteristics associated with individual scenes of each of the multiple multimedia contents, which are determined according to production stage information of the multimedia content. The one or more processors are also configured to provide, via the user interface of the media player, a list of the one or more media files to the user. In some embodiments, the one or more processors are also configured to receive, via a user interface of a media player, a user input from the user and impose a restriction on the list of the one or more media files based on the user input (e.g., preventing kids from viewing violent video snippets).

Figure 7:
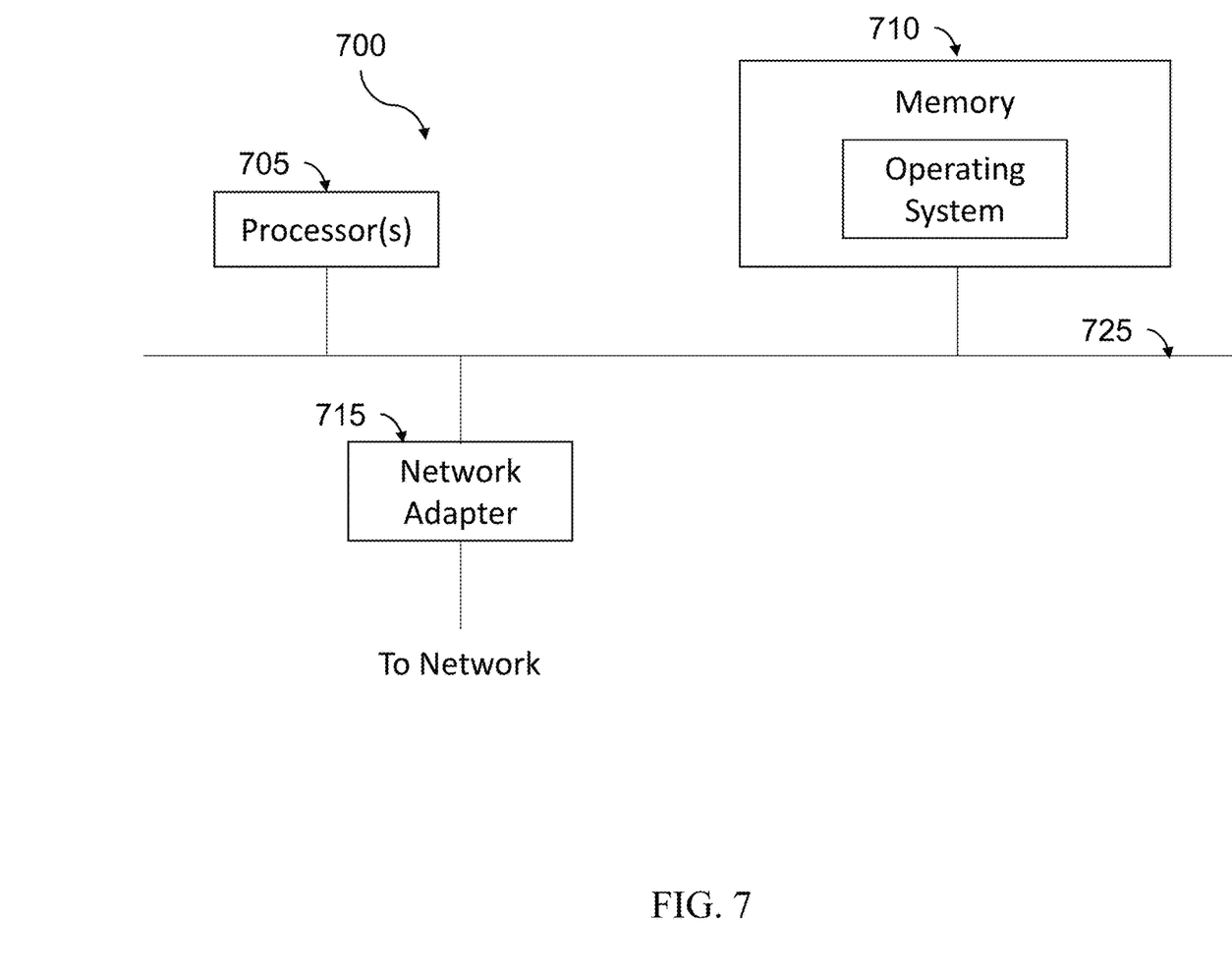
FIG. 7 is a block diagram illustrating an example of the architecture for a computer system or other control device that can be utilized to implement various portions of the presently disclosed technology.

FIG. 7 is a block diagram illustrating an example of the architecture for a computer system or other control device 700 that can be utilized to implement various portions of the presently disclosed technology (e.g., processor(s) to perform transcoding or transmuxing). The computer system 700 includes one or more processors 705 and memory 710 connected via an interconnect 725. The interconnect 725 may represent any one or more separate physical buses, point to point connections, or both, connected by appropriate bridges, adapters, or controllers. The interconnect 725, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 705 may include central processing units (CPUs) to control the overall operation of, for example, the host computer. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 710 can be or include the main memory of the computer system. The memory 610 represents any suitable form of random access memory (RAM), read-only memory (ROM), flash memory, or the like, or a combination of such devices. In use, the memory 710 may contain, among other things, a set of machine instructions which, when executed by processor 705, causes the processor 705 to perform operations to implement embodiments of the presently disclosed technology.

Also connected to the processor(s) 705 through the interconnect 725 is a (optional) network adapter 715. The network adapter 715 provides the computer system 700 with the ability to communicate with remote devices, such as the storage clients, and/or other storage servers, and may be, for example, an Ethernet adapter or Fiber Channel adapter.

With the assistance from the production stage information, the techniques as disclosed herein allow viewers to have completely different viewing experiences of movies, TV shows or videos. Using the disclosed techniques, not only the directors/producers can produce different versions of the content based on the same raw data captured at the production stage, content providers also enjoy the flexibility of creating custom versions of the movies, TV shows, or other contents suitable for various viewer groups (e.g., based on viewer subscription plans). Furthermore, content providers can have better control of commercial placement in the movies, TV shows, or other contents to provide seamless viewing experience to the viewers. Real-time streaming of different versions of the same content, such as drama or movies, becomes possible.

Moreover, viewers can have the flexibility of creating custom content on the fly at the viewing time. Viewers also have the option of viewing the same shot/scene from different angles based on the draw data captured at the production stage. Given the rich production stage information embedded in the metadata, the disclosed techniques can be used enable to the viewers to locate contents of interest from a vast amount of available contents on the network.

The above examples demonstrate that the techniques and systems disclosed in this patent document for packaging and distribution of movies, TV shows and other multimedia can be used to enhance the existing technologies adopted by movie and TV production companies to provide flexibility and features that are not available in various conventional movie or TV programs. In addition, the disclosed techniques make real-time content distribution and viewing much more user friendly.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, machine-readable script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A computer-implemented method for processing a multimedia content, comprising:
   receiving one or more media files and metadata information of the multimedia content, wherein each of the one or more media files comprises raw video or audio data captured at a production stage for producing the multimedia content, and wherein the metadata information indicates production stage information of the multimedia content, the metadata information determined during or after the production stage for producing the multimedia content;
   determining a hierarchical structure of the multimedia content based on the production stage information of the multimedia content, wherein the hierarchical structure indicates that the multimedia content comprises multiple scenes, each of the multiple scenes comprising multiple shots produced with corresponding devices and cast, wherein the production stage information includes a time-domain start position and a duration for each of the multiple scenes for the determining of the hierarchical structure;
   generating, for individual scenes in the multimedia content, multiple edited media files for different viewers or viewer groups using the raw video or audio data captured at the production stage, wherein the multiple edited media files are stored separately from the raw video or audio data in the hierarchical structure of the multiple content;
   identifying, for individual scenes in the hierarchical structure of the multimedia content, characteristics associated with the individual scenes based on the production stage information;
   generating multiple copies of the multimedia content at different compression levels, wherein the different compression levels are adaptively adjusted for the individual scenes based on the characteristics associated with the individual scenes; and
   dividing each of the multiple copies of the multimedia content into segments based on the hierarchical structure, wherein a length of a segment is adaptively adjusted based on the characteristics associated with the individual scenes.

2. The method of claim 1, comprising:
   transferring the segments of a copy of the multimedia content to a user over a network, wherein the copy of the multimedia content is determined based on conditions of the network.

3. The method of claim 1, wherein the one or more media files are organized according to the hierarchical structure, and wherein the hierarchical structure comprises information identifying a location of a media file in the multimedia content.

4. The method of claim 1, wherein the production stage information comprises at least a genre of the multimedia content, information about devices and cast for a shot, or content of video or audio data corresponding to a shot.

5. The method of claim 1, wherein the characteristics associated with the individual scenes indicate an amount of motions in the individual scenes.

6. The method of claim 1, comprising:
   generating, based on the same video or audio data captured at the production stage, multiple versions of the multimedia content corresponding to different storylines, wherein each version of the multimedia content corresponds to a navigation list that represents the hierarchical structure of the multimedia content of the version.

7. The method of claim 1, comprising:
   inserting a commercial media file between two adjacent segments of the multimedia content based on a content of the commercial media file and contents of the two adjacent segments, wherein a navigation list of the multimedia content comprises information about a transition type between the commercial media file and the two adjacent segments.

8. The method of claim 1, comprising:
   displaying, in one or more navigation lists shown via a user interface of a media player, multiple versions of the multimedia content corresponding to different storylines generated based on the same video or audio data captured at the production stage, the different storylines comprising at least a first storyline and a second storyline;
   receiving a user input via the user interface of the media player indicating a switch from the first storyline to the second storyline; and
   displaying a version of the multimedia content corresponding to the second storyline to a user.

9. The method of claim 1, comprising:
   displaying a first media file of the multimedia content to a user via a network;
   displaying, in a navigation list shown via a user interface of a media player, information about the hierarchical structure of the multimedia content to the user;
   receiving a user input via the user interface of the media player, wherein the user input indicates a viewing change from the first media file to a second media file, wherein the first media file and the second media file are associated with a same device, a same shot, or a same scene in the multimedia content; and
   switching to display the second media file to the user.

10. The method of claim 9, wherein the first media file and the second media file are captured at different angles by the same device or different devices.

11. The method of claim 9, wherein the second media file comprises video or audio data captured for a shot or a scene, and wherein the first media file comprises an edited version of the video or audio data captured for the shot or the scene.

12. The method of claim 1, comprising:
simultaneously displaying, in a view area that comprises multiple sub-regions, multiple media files captured at different angles for one or more shots, wherein one of the media files is displayed in a first sub-region that has a larger dimension than other sub-regions.

13. The method of claim 1, wherein each segment of a copy of the multimedia content is within boundaries of a shot.

14. The method of claim 13, comprising:
inserting a commercial media file between two segments of at least one copy of the multimedia content.

15. The method of claim 1, comprising:
receiving a search keyword via a user interface of a media player from a user;
determining, based on the characteristics associated with the individual scenes, a subset of media files corresponding to the search keyword; and
providing, via the user interface of the media player, a list of the subset of media files.

16. The method of claim 15, comprising:
imposing a restriction on the list of the subset of media files based on a user input.

17. A system for editing a multimedia content, comprising:
one or more processors, and
one or more memories including processor executable code, wherein the processor executable code upon execution by the one or more processors configures the one or more processors to:
receive one or more media files and metadata information of the multimedia content, wherein the multimedia content is organized using a hierarchical structure indicating that the multimedia content comprises multiple scenes, each of the multiple scenes comprising multiple shots produced with corresponding devices and cast, wherein each of the one or more media files comprises raw video or audio data captured at a production stage for producing the multimedia content, and wherein the metadata information indicates production stage information of the multimedia content including a time-domain start position and a duration for each of the multiple scenes, and wherein the metadata information is determined during or after the production stage for producing the multimedia content;
determine the hierarchical structure of the multimedia content based on the production stage information of the multimedia content;
generate, for an individual scene of the multimedia content, multiple edited media files for different viewers or viewer groups using the raw video or audio data captured at the production stage; and
store the one or more edited media files separately from the video or audio data captured for the individual scene according to the hierarchical structure of the multimedia content.

18. The system of claim 17, wherein the one or more processors are configured to:
generate, based on the same video or audio data captured at the production stage, multiple versions of the multimedia content corresponding to different storylines.

19. The system of claim 17, wherein the one or more processors are configured to:
identify, for individual scenes in the hierarchical structure of the multimedia content, characteristics associated with the individual scenes based on the production stage information;
divide the multimedia content into segments based on the hierarchical structure, wherein each segment of the multimedia content is within boundaries of a shot, and wherein a length of the segment is adaptively adjusted based on the characteristics associated with the individual scenes.

20. The system of claim 19, wherein the one or more processors are configured to:
insert a commercial media file between two segments of the multimedia content based on a content of the commercial media file and contents of the two segments.

21. The system of claim 19, wherein the one or more processors are configured to:
generate multiple copies of the multimedia content at different compression levels, wherein the different compression levels are adaptively adjusted for the individual scenes based on the characteristics associated with the individual scenes.

22. A system for viewing a multimedia content, comprising:
one or more processors, and
one or more memories including processor executable code, wherein the processor executable code upon execution by the one or more processors configures the one or more processors to:
display, by a media player, a first media file of a copy of the multimedia content to a user over a network;
receive, via a user interface of the media player, a first user input that triggers a display of information about a hierarchical structure of the multimedia content in a navigation list;
display, via the user interface, the navigation list showing the hierarchical structure of the multimedia content, wherein the hierarchical structure indicates that the multimedia content comprises multiple scenes, each of the multiple scenes comprising multiple shots produced with corresponding devices and cast, and wherein the hierarchical structure is determined based on production stage information that includes a time-domain start position and a duration for each of the multiple scenes;
receive, via the user interface, a second user input that indicates a viewing change from the first media file to a second media file, wherein the first media file and the second media file are associated with a same device, a same shot, or a same scene in the multimedia content; and
display, by the media player, the second media file to the user.

23. The system of claim 22, wherein the first media file and the second media file are generated based on same video or audio data captured at a production stage corresponding to different storylines.

24. The system of claim 22, wherein the first media file and the second media file are captured at different angles by the same device or different devices.

25. The system of claim 22, wherein the second media file comprises video or audio data captured for a shot or a scene, and wherein the first media file comprises an edited version of the video or audio data captured for the shot or the scene.

26. The system of claim 22, wherein the one or more processors are configured to:
receive, via the user interface of the media player, a third user input that triggers a fast-forward or a rewind of the multimedia content to a different shot or a different scene; and adjust a display time of the multimedia content based on a time-domain boundary of the different shot or the different scene.

27. The system of claim 22, wherein the one or more processors are configured to:

receive, via a user interface of a media player, a search keyword from a user;

select one or more media files from multiple multimedia contents according to the search keyword, wherein the one or more media files are selected based on an amount of motion associated with individual scenes of each of the multiple multimedia contents, wherein the amount of motion associated with individual scenes is determined according to production stage information of the multiple multimedia contents including at least a genre type or information of a plurality of shots in each of the individual scenes; and provide, via the user interface of the media player, a list of the one or more media files to the user.

28. The system of claim 27, wherein the one or more processors are configured to:

receive, via the user interface of the media player, a user input from the user; and impose a restriction on the list of the one or more media files based on the user input.

29. The system of claim 27, wherein each of the one or more media files is divided into segments based on the hierarchical structure of a corresponding multimedia content, and wherein a length of a segment is adaptively adjusted based on the amount of motion associated with the individual scenes of the corresponding multimedia content.

* * * * *